Oct. 23, 1934.  E. F. VANDERBOSCH  1,978,066
PROPULSION DEVICE FOR VEHICLES
Filed June 16, 1932   2 Sheets-Sheet 1
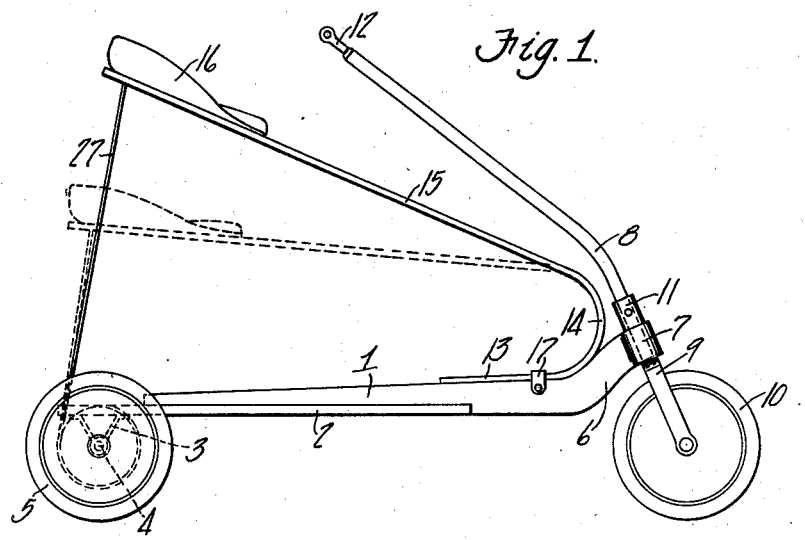
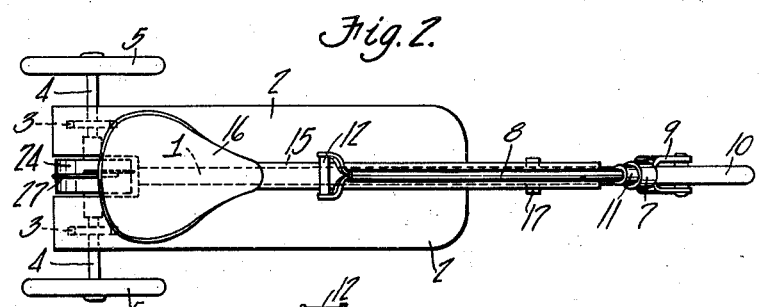
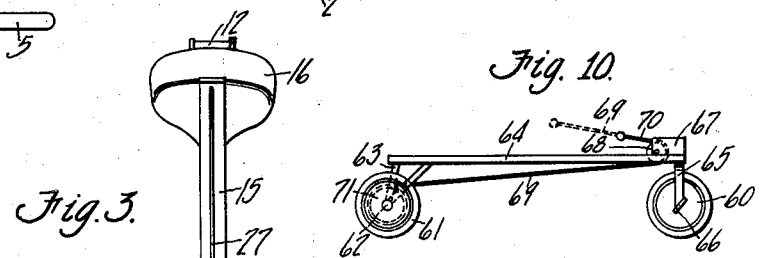
INVENTOR.
Edward F. Vanderbosch
BY 
ATTORNEY.

Oct. 23, 1934.                E. F. VANDERBOSCH                 1,978,066
                        PROPULSION DEVICE FOR VEHICLES
                           Filed June 16, 1932        2 Sheets-Sheet 2

INVENTOR.
Edward F. Vanderbosch.
BY
ATTORNEY.

Patented Oct. 23, 1934

1,978,066

UNITED STATES PATENT OFFICE 1,978,066

PROPULSION DEVICE FOR VEHICLES

Edward F. Vanderbosch, Mishawaka, Ind.

Application June 16, 1932, Serial No. 617,591

3 Claims. (Cl. 74—141)

The invention relates to propulsion devices for vehicles, and particularly to propulsion devices for children's toy vehicles.

The principal object of the invention is to provide a device of this character which is substantially noiseless in operation.

A further object is to provide a device of this character comprising a toothed wheel driven by a ratchet which has operatively associated therewith means for moving it clear of the wheel upon relative movement of the ratchet and wheel.

A further object is to provide a device of this character comprising a driven member, a driving are propelled by the hands, the feet, or the movement of the body of the rider.

A further object is to provide a device of this character comprising a driven member, a driving member carried by and movable relative to the driven member, and means carried by the driving member for engaging the driven member upon the application of power to the driving member and disengaging said driven member upon cessation of the application of power to the driving member.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a side elevation of a vehicle having my improved propulsion device applied thereto and operable by movement of the body of the rider.

Figure 2 is a top plan view of the vehicle.

Figure 3 is a rear elevation of the vehicle.

Figure 10 is a side view of a vehicle propelled by the hands and having my improved propulsion device applied thereto.

Figure 4:
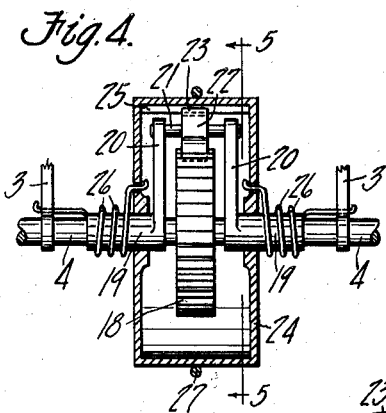
Figure 4 is a side view of my improved propulsion device with parts shown in section.

Referring to the drawings, and particularly to Figures 1 to 6 thereof which illustrate the preferred embodiment of the invention, the numeral 1 designates the center bar of the frame of the vehicle which carries foot boards 2 at opposite sides thereof. Brackets 3 are carried by the under sides of the foot boards 2 adjacent the rear end thereof and journal an axle 4 on which the rear wheels 5 of the vehicle are mounted. The forward end of the center bar 1 is provided with an upwardly bent portion 6 terminating in a journal 7 in which a rod 8 is journaled. At the lower end of rod 8 is mounted a bracket 9 mounting the front wheel 10 of the vehicle. A collar 11 encircles the rod 8 and bears upon the upper end of journal 7 to position said rod 8 relative to the vehicle frame. The rod 8 extends angularly upwardly and rearwardly and mounts a handle 12 at its upper end. A flat leaf spring 13 is secured to the upper side of the center bar 1 in spaced relation rearwardly of bend 6 thereof and extends forwardly to said bend where it is return bent at 14 and thence extends angularly rearwardly at 15, and terminate substantially above the rear wheels 5. A seat 16 is mounted on the rear end of portion 15 of the spring. A clip 17 secures the spring to the bar 1 adjacent the bend 6 of said bar.

A ratchet wheel 18 is fixedly mounted on axle 4 at the center thereof. On opposite sides of the wheel 18 and in spaced relation thereto are mounted collars 19, each of which carries an arm 20 at its inner end extending perpendicularly of said axle. The outer ends of arms 20 are interconnected by a bar 21 positioned in spaced relation to the teeth of wheel 18. A pawl 22 is pivotally mounted on bar 21 and is adapted to engage the teeth of the ratchet wheel 18. At the end of the pawl opposite its nose is provided a pair of spaced ears 23, for purposes to be hereinafter set forth. A casing 24 is journaled on collars 19 and encloses wheel 18, arms 20, and pawl 22. The casing is drum-shaped and carries a boss 25 extending radially inwardly of the circular outer portion thereof. The ears 23 of the pawl 22 are positioned on opposite sides of boss 25. A coil spring 26 encircles each collar 19 and is secured at one end to the casing 24 and at the opposite end to the bracket 3. A cable 27 is fixed at one end and wound around the casing 24, and is secured at its opposite end to the spring 15 adjacent the upper end thereof. A stop 28 extends into the casing to limit the pivotal movement of pawl 22.

Figure 5:
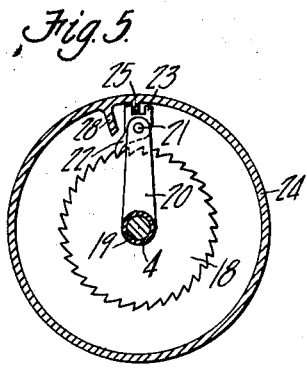
Figure 5 is a transverse sectional view taken on line 5—5 of Figure 4.

The operation of the device is as follows: The child sits upon seat 16, grasps handle 12, and places his feet on the floor boards 2. His weight upon the seat depresses the spring 15 to the dotted line position shown in Figure 1, which permits winding of the cable upon the drum housing which, as viewed in Figure 5, is rotated relative to collar 19 and shaft 4 in clockwise direction. The movement of the casing 24 relative to arms 20, which are initially held against movement by the steadying action of spring 26 coiled about collar 19, brings the boss 25 into engagement with the rear ear 23 of pawl 22 and thereby pivots said pawl out of engagement with the teeth of the ratchet wheel 18, whereby the clicking noise of reverse movement of the pawl relative to the ratchet wheel is avoided. The drum continues to rotate relative to the arms 20 until the pawl 22 is pivoted into engagement with the stop 28 of the casing, at which time, the pawl being prevented from further pivoting, the rotation of the drum is transmitted through the stop 28 and pawl 22 to the arms 20. After the seat has been thus depressed, the child stands to substantially erect position on the foot boards 2, and the seat 16 is then returned to its starting position by the spring 15, which is quite heavy and of great strength. The action of the spring pulls upon cable 27 to rotate drum housing 24 in the opposite direction (counter clockwise as viewed in Figure 5) which rotation of the housing is again independent of the collar 19 and axle 4 until such time as the boss 25 has engaged the forward ear 23 of pawl 22 to bring the pawl into operative driving engagement with the teeth of the ratchet wheel, whence continued rotation of the housing 24 is imparted to the ratchet wheel through the pawl and thus drives the axle upon which the ratchet wheel is fixedly mounted. It will be seen that this driving rotation of the housing also tensions spring 26 whereby it is ready to reversely rotate the housing upon subsequent depression of seat 16. The predetermined controlled pivoting of the pawl 22 into and out of engagement with the ratchet wheel 18 insures positive action of the device at all times and entirely eliminates the noise usually resulting from the operation of these devices, particularly during the non-working or reverse movement of the pawl relative to the ratchet wheel.

It will be obvious from a consideration of the above description of the construction and mode of operation, that the mode of operation may be easily reversed or changed by a few simple structural changes of the device whereby the depression of the seat mounting spring 15 under the weight of the rider will be the working or power applying action of the device.

Figure 7:
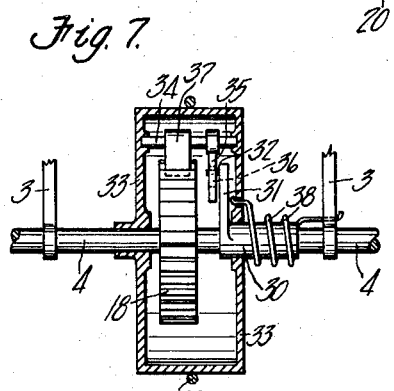
Figure 7 is a side view, with parts shown in section, of a modified type of my improved propulsion device.
Figure 8:
Figure 8 is a transverse sectional view taken on line 8—8 of Figure 7.

In Figures 7 and 8 are illustrated a modified form of my improved propulsion device. In this construction one collar 30 is mounted on the axle 4 in spaced relation to the ratchet wheel 18 fixedly mounted on the axle. An arm 31 is carried by collar 30 and extends perpendicularly of the axle, and a pin 32 is carried by said arm. A drum shaped housing 33 is journaled at one of its ends on the collar 30 and at its opposite side on axle 4, and in this housing is journaled a bar 34 in spaced relation to the ratchet wheel 18 and parallel axle 4. An arm 35 is fixedly mounted on bar 34 and extends in close parallel relation to arm 31, said arm 35 having an elongated slot 36 formed therein for the reception of pin 32 to provide a pin and slot connection between arms 31 and 35. A pawl 37 is fixedly mounted on bar 34 and is adapted to engage the teeth of the ratchet wheel. A coil spring 38 encircles the collar 30 and is fixedly secured at its opposite ends to the housing 33 and the bracket 3 supporting the frame of the vehicle.

This device is operable by a cable 39 secured to and wound around the drum-housing at one of its ends and secured to the power member at its opposite end, as described above relative to the preferred embodiment of the invention. The operation of this type of propulsion device is as follows: Assuming that the vehicle has just completed the power stroke, release of cable 39 permits spring 38 to rotate housing 33 in clockwise direction, as viewed in Figure 8, relative to collar 30 and axle 4. The pin and slot interconnection between arm 31 carried by the collar and arm 35 carried by bar 34 pivots said bar 34 and the pawl 37 carried thereby as shown in dotted lines in Figure 8, whereby the pawl is moved clear of the ratchet wheel during the non-working reverse movement of the housing. The pin and slot connection is so formed that when pawl 37 and bar 34 have been pivoted a predetermined distance the pin 36 will have reached the end of its movement in slot 32 whereby the pawl cannot be pivoted enough to engage the periphery of the housing, and the housing will then rotate arm 31 and collar 30. When the spring 38 has wound the cable 39 upon the drum-housing, a counter-clockwise pull upon cable 39 begins the power or working stroke of the device. The initial counter-clockwise movement of the housing 33 relative to the arm 31 carried by collar 30 pivots bar 34 and pawl 37 to bring said pawl into engagement with the teeth of the ratchet wheel, and the remainder of said movement is imparted by pawl 37 to the ratchet wheel 18 and axle 4 whereby the vehicle is driven and the coil spring 38 is retensioned.

Figure 9:
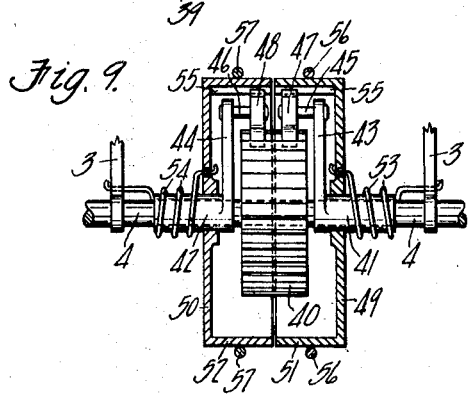
Figure 9 is a side view, with parts shown in section, of another modified type of my improved propulsion device.

In Figure 9 is illustrated a second modified type of propulsion device which is particularly adapted for use on a vehicle operable by alternate movement of the two arms or legs of the rider. In this construction the frame supporting brackets 3 are journaled to the axle 4 which has keyed or otherwise fixedly secured thereto a ratchet wheel 40 of substantially greater width than that used in the previously described constructions. At opposite sides of wheel 40 and spaced therefrom collars 41 are loosely mounted on axle 4 and carry arms 43 and 44, respectively, at their inner ends, said arms extending perpendicular to axle 4. At the outer ends of arms 43, 44 are mounted pins 45 and 46, respectively which extend parallel axle 4 and in the direction of each other, but whose inner ends are spaced apart. Pawls 47 and 48, respectively, are pivotally carried by pins 45 and 46. Discs 49 and 50 carrying cylindrical flanges 51 and 52, respectively, are journaled upon collars 41, 42, respectively, and are positioned with the inner edges of their cylindrical flanges closely spaced to form a drum-shaped two-part housing enclosing ratchet wheel 40, arms 43, 44, and pawls 47, 48. A coil spring 53 encircles collar 41 and is fixed at its ends to disc 49 and one of the brackets 3; and a second coil spring 54 encircles collar 42 and is fixed at its ends to disc 50 and the other bracket 3. Each of the cylindrical flanges 51, 52 carries an inwardly directed boss 55. The pawls 47, 48 are of the same shape as pawls 22 illustrated in the preferred embodiment of the invention, being provided with a pair of spaced ears at the ends thereof opposite the pawl nose, and said ears are positioned on opposite sides of the bosses 55 of the adjacent cylindrical flange. A cable 56 has one of its ends wound around and secured to cylindrical flange 51; and a second cable 57 has one end thereof wound around and secured to cylindrical flange 52. The opposite ends of both cables 56, 57 are secured to a suitable power supplying means of the vehicle, as for instance, opposite foot pedals or hand grips.

Figure 6:
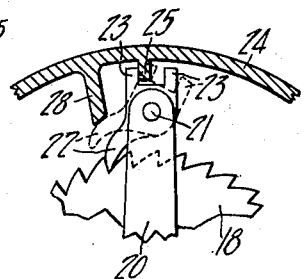
Figure 6 is an enlarged fragmentary sectional view of the propulsion device.

It will thus be seen that this modified type of device substantially comprises a pair of propulsion devices of the type illustrated in Figures 4 to 6, and the operation of the pawls 47, 48 is substantially the same as the operation of pawl 22 of the preferred construction. The device comprises a two-part driving mechanism for acting upon the ratchet wheel 40, and has the advantage over the other constructions previously described of providing for the continuous application of driving force to the ratchet wheel. Thus, it is possible for the two parts to be alternately operated whereby, when pawl 47 is passing through its working stroke, the pawl 48 may pass through its reverse non-working stroke so that it will be ready for its working stroke when the pawl 47 begins its reverse stroke. In this way, instead of the intermittent applications of power to the ratchet wheel and axle as in the previously described constructions, power may be steadily applied to the wheel and axle to eliminate the loss of momentum incident to intermittent operation and to enable a greater speed to be attained with the device.

In Figure 10 is illustrated another type of vehicle to which my improved propulsion device may be applied. This vehicle has a front wheel 60 and a pair of rear wheels 61 mounted on an axle 62. A bracket 63 is journaled on axle 62 and supports a seat 64 adjacent the rear end thereof. A bracket 65 is pivoted to the forward under side of seat 64 to mount front wheel 60, and carries foot bars 66 by which the vehicle may be steered. A block 67 is carried by the forward upper side of the seat 64 and journals a pulley 68 projecting through a suitable opening in the seat. A cable 69 carrying a handle 70 at one end thereof runs over said pulley and back to the drum housing 71 journaled on axle 62 and housing one of the types of propulsion devices illustrated in the drawings and previously described. It will be seen that with this device the rider sits upon seat 64, placing his feet upon foot bars 66, and pulls upon the handle 70 of cable 69 to impart driving movement to the propulsion device. Release of the cable then permits the cable to rewind itself on the drum.

It will be seen that in each of the three types of the device illustrated, means are provided for retracting the pawl or pawls from the ratchet wheel during the reverse non-working movement thereof relative to the ratchet wheel, whereby the action of the device will be substantially silent at all times and wear on the parts will be minimized.

The invention having been set forth, what is claimed as new and useful is:

1. In combination, a driven shaft, a ratchet wheel fixedly carried by said shaft, a collar loosely mounted on said shaft, an arm carried by said collar in spaced relation to said ratchet wheel, a pawl pivotally carried by said arm and selectively engageable with said ratchet wheel, a pair of spaced lugs carried by said pawl, a housing journaled on said collar and enclosing said ratchet wheel, arm and pawl, a boss carried by said housing and positioned between said pawl lugs, a stop carried by said housing for limiting the pivoting of said pawl, a spring secured at one end to said housing and at the other end to a stationary member, and means for rotating said housing in one direction to tension said spring and move said housing and boss initially to pivot said pawl into engagement with said ratchet and subsequently to impart the rotation of said housing through said boss and pawl to said ratchet wheel and shaft, said spring reversely rotating said housing upon release of said last named means to initially tilt said pawl out of engagement with said ratchet wheel and against said stop, whereby said pawl, arm and collar are subsequently moved with said housing and said pawl is positioned in spaced relation to said ratchet wheel.

2. In combination, a driven shaft, a ratchet wheel fixedly carried by said shaft, a collar loosely mounted on said shaft, an arm carried by said collar in spaced relation to said ratchet wheel, a pawl pivotally carried by said arm and selectively engageable with said ratchet wheel, a housing journaled on said collar and encasing said ratchet wheel, arm and pawl, means carried by said housing for pivoting said pawl, a stop carried by said housing for limiting the pivotal movement of said pawl, a spring secured at one end to said housing and at the other end to a stationary member, and means for rotating said housing in one direction in opposition to said spring, whereby said pawl pivoting means will pivot said pawl into engagement with said ratchet wheel to transmit the rotation of said housing to said ratchet wheel and shaft, said spring reversely rotating said housing upon release of said rotating means to bring said pawl pivoting means into engagement with said pawl to shift said pawl clear of said ratchet wheel and against said stop, whereby the reverse rotation of said housing is transmitted through said pawl to said arm.

3. In combination, a driven shaft, a ratchet wheel fixedly mounted on said shaft, a pawl, means loosely mounted on said shaft for pivotally mounting said pawl for selective engagement with said ratchet wheel, a housing rotatable independently of said shaft and encasing said ratchet wheel, pawl and pawl carrying means, means carried by said housing for pivoting said pawl, a stop carried by said housing for limiting the pivoting of said pawl, a spring secured at one end to said housing and at the other end to a stationary member, and means for rotating said housing in one direction in opposition to said spring, whereby said pawl pivoting means will pivot said pawl into engagement with said ratchet wheel to transmit the rotation of said housing to said ratchet wheel and shaft, said spring reversely rotating said housing upon release of said rotating means to bring said pawl pivoting means into engagement with said pawl to pivot said pawl clear of said ratchet wheel and into engagement with said stop, whereby the reverse rotation of said housing is transmitted through said pawl to said pawl mounting means.

EDWARD F. VANDERBOSCH.